Dec. 10, 1957   A. A. STERK   2,816,263
VOLTAGE REGULATOR
Filed July 22, 1955
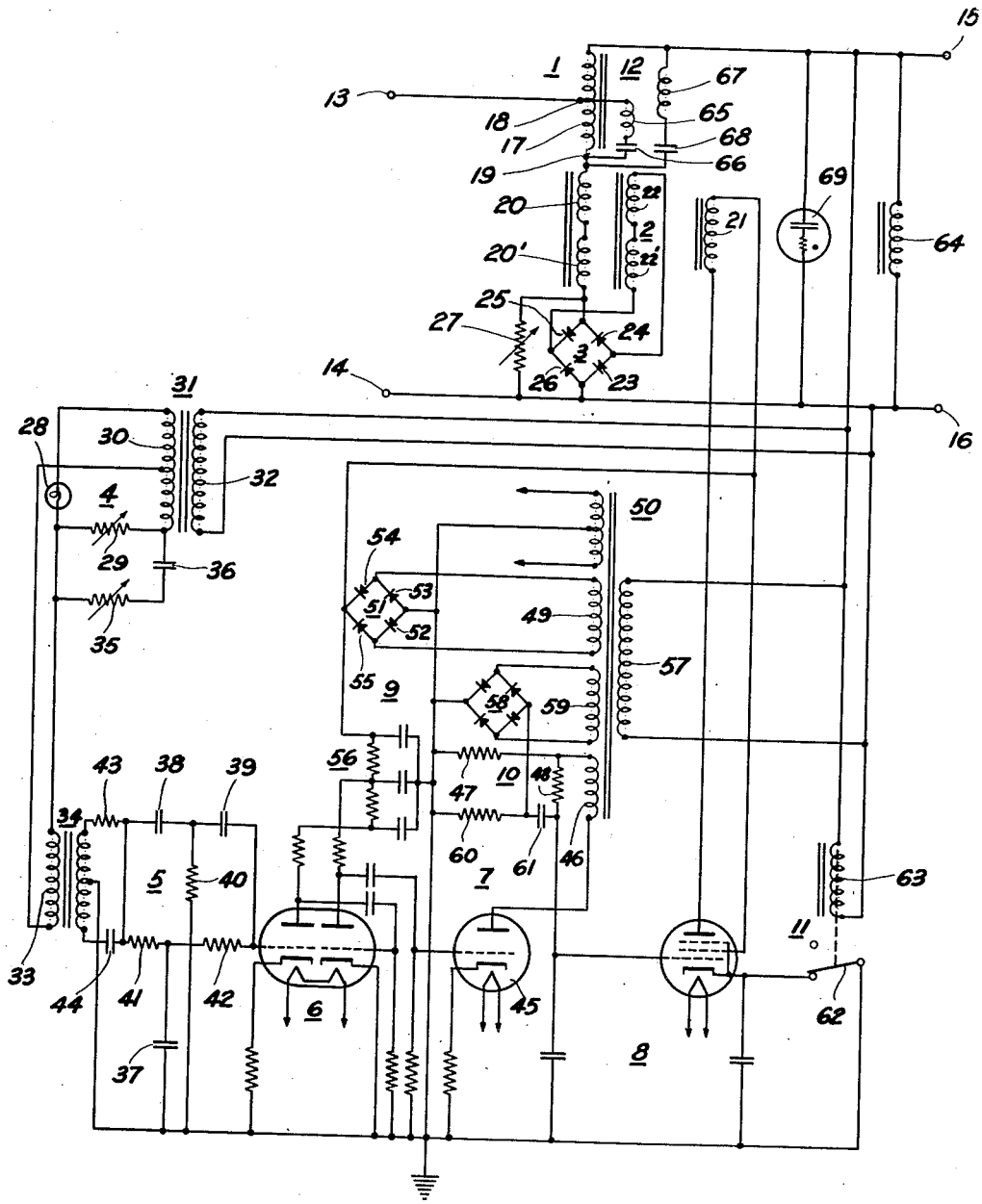
INVENTOR.
ANDREW A. STERK.
BY
AGENT.

United States Patent Office 2,816,263
Patented Dec. 10, 1957

2,816,263

VOLTAGE REGULATOR

Andrew A. Sterk, Yonkers, N. Y., assignor to North American Philips Company, Inc., New York, N. Y.

Application July 22, 1955, Serial No. 523,799

9 Claims. (Cl. 323—66)

The invention concerns voltage regulators and particularly a regulator for controlling the output voltage supplied to a load so that it remains substantially constant notwithstanding changes of the input voltage or the load supplied thereby.

The principal object of this invention is the provision of a highly stable electronic voltage regulator.

An object of this invention is the provision of a voltage regulator which maintains an output voltage constant to within a fraction of one percent despite variations of the input line voltage or load.

Another object of this invention is the provision of a voltage regulator which stabilizes an output voltage within a short time after connection to a line.

A further object of this invention is the provision of a voltage regulator embodying overload protection.

These and other objects and features of the invention will be apparent from a consideration of the following detailed description taken in connection with the accompanying drawing wherein a preferred embodiment of the invention is shown.

The regulating system shown in the drawing comprises an autotransformer 1, a saturable reactor system 2, a bridge type rectifier 3, a voltage sensing circuit 4, a filter circuit 5, an amplifier 6, a phase detector 7, a direct current amplifier 8, a power supply circuit 9, a first derivative producing circuit 10, an overvoltage cutout relay 11 and third and fifth harmonic suppression filters 12.

The autotransformer 1, the saturable reactor system 2 and the rectifier 3 are connected in series between the input terminals 13 and 14 and between the output terminals 15 and 16; the primary winding 17 of the autotransformer between the tap 18 on the autotransformer and the lower end terminal 19 thereof, being connected in series with these units between the input terminals. The secondary winding of the autotransformer comprising the entire winding between the lower and upper end terminals, is connected in series with these units between the output terminals.

The saturable reactor system 2 comprises alternating current windings 20 and 20', a first direct current winding 21 and second direct current windings 22 and 22', all wound about the arms of two cores in a magnetic relationship known in the art. The alternating current windings 20 and 20' are connected in series between the upper input terminal of the bridge type rectifier 3 and the lower end terminal of the autotransformer 1 and therefore the output voltage of the autotransformer is controllable by varying the effective reactance of said alternating current windings. The effective reactance of the alternating current windings 20 and 20' is controlled by the magnetic condition of the cores of the saturable reactor system 2 produced by the current flowing through the first direct current winding 21 and aided by the current flowing through the second direct current windings 22 and 22' in the same sense.

The current flow through the second direct current windings 22 and 22' is controlled primarily by the current flow through the first direct current winding 21 and secondarily by the input voltage on the rectifier 3 which is connected between the input terminal 14 and the lower end terminal of the alternating current winding 20'. The primary purpose of the rectifier 3 and the windings 22 and 22' is to so increase the amplification of the saturable reactor system 2 that the current flowing through the winding 21 may remain at a relatively low level. The rectifier 3 comprises rectifiers 23, 24, 25 and 26 in full wave rectification bridge type connection. The input voltage of the regulating system is impressed upon the rectifier 3 and the output voltage of said rectifier is impressed across the second direct current windings 22 and 22'. The sensitivity of the control effected by the direct current windings 22 and 22' on the alternating current windings 20 and 20' may be adjusted by means of a variable resistor 27 which shunts the rectifier 3.

For absolute voltage control within the small tolerance value above-noted, there are provided, in accordance with the invention, the voltage sensing circuit 4, the filter circuit 5, the amplifier 6, the phase detector 7, the direct current amplifier 8, the power supply circuit 9 and the first derivative producing circuit 10.

The voltage sensing circuit 4 comprises a bridge arrangement, two arms of which are constituted by a voltage responsive variable resistor preferably in the form of an incandescent lamp filament 28, and a variable resistor 29, and the other two arms of which are formed by the tapped secondary winding 30 of a transformer 31. The transformer 31 is connected by means of its primary winding 32 to the output terminals 15 and 16 of the regulating system. The balance position, that is, the desired output voltage of the regulating system, is adjustable by varying the value of the resistor 29. The voltage sensing circuit 4 operates to produce an output voltage across the primary winding 33 of a transformer 34 either in a given phase with respect to the phase of the input signal or in phase opposition to the said given phase depending on whether the input applied thereto is greater or less than the desired voltage to which the bridge is balanced. The amplitude of said output voltage is determined by the extent of the unbalance of the said sensing circuit.

A variable resistor 35 and a capacitor 36 counteract the effect of the inductive component in the equivalent circuit of the lamp 28 to maintain proper phase balance in the sensing circuit.

In order to attenuate harmonic components which may be produced by the sensing circuit 4, there is provided a filter 5 which may be in the form of a twin T network and which, in the specific arrangement shown, comprises capacitors 37, 38 and 39 and resistors 40, 41 and 42. In order to compensate for phase changes of the signal between the input winding 32 of transformer 31 and the output of the filter 5, a suitable phase shifting network constituted by a resistor 43 and a capacitor 44 may be interposed between the output of transformer 34 and the input of the filter 5.

The voltage derived from the filter 5 is applied to the amplifier 6 and thereafter applied to the phase detector 7 which in the form illustrated comprises a triode 45, an anode energizing winding 46 and an anode load resistor 47. Triode 45 has its control grid energized by the amplified error signal and its anode energized by an alternating voltage of fixed phase from the winding 46. The phase detector operates to produce an output voltage across the load resistor 47 having variation above and below a given reference voltage and to an extent as determined by the phase and amplitude of the error signal applied to the control grid thereof. This output voltage is in turn supplied to the control grid of the direct current amplifier 8 and serves to vary the anode current thereof in a corresponding manner. More particularly, when the error signal applied to the phase detector 7 is in phase with the anode voltage of the phase detector, the voltage appearing across resistor 47 becomes more negative than the equilibrium voltage and the extent of the change is determined by the extent of the unbalance of the sensing circuit 4. When the error signal applied to the phase detector is 180 degrees out of phase with respect to the anode voltage, the voltage across resistor 47 becomes more positive with respect to the reference voltage and the extent of this change is similarly determined by the extent of the unbalance in the opposite direction of the sensing circuit 4. The so varying voltage produced across resistor 47 is applied as a variable bias voltage to the control grid of the amplifier 8 through an isolating resistor 48.

The bias variations so applied to the direct current amplifier 8 in turn produce corresponding variations of the anode current thereof. Since the anode circuit of amplifier 8 includes the first direct current winding 21 of the saturable reactor system 2, corresponding variations of the direct current flux of the saturable reactor are produced and absolute control of the effective reactance of the alternating current windings 20 and 20' is brought about thereby.

The power supply circuit 9 derives plate voltage for the amplifiers 6 and 8 from the output voltage of the regulating system by means of a secondary winding 49 of a transformer 50, a full wave rectification bridge 51 comprising rectifiers 52, 53, 54 and 55, and an RC filter circuit 56. The regulating system output voltage is impressed across the primary winding 57 of the transformer 50.

The control of the effective reactance of the alternating current windings 20 and 20', by the control of the current flowing through the direct current winding 21, is prevented from "hunting" by supplying to the control circuit a voltage indicative of the sense of any changes of the output voltage of the regulator system. This sensing voltage is produced by the first derivative producing circuit 10 comprising a rectifier 58 energized by a winding 59 of the transformer 50 and a load resistor 60. Changes in the output voltage produce corresponding changes of the voltage across resistor 60 and these changes are differentiated and applied to the control grid of the amplifier 8 by means of the condenser 61.

The overvoltage cutout relay 11 operates to open the cathode circuit of the direct current amplifier 8 by attracting its armature 62 when its coil 63 is energized by a load voltage of magnitude higher than a predetermined level. When the cathode circuit of the amplifier 8 is opened, the current supplied to the direct current winding 21 decreases sufficiently to increase the reactance of the alternating current windings 20 and 20' to the level where the regulating system output voltage is reduced to a predetermined safe low level. Preferably, the relay 63 has a dropout voltage lower than the predetermined level voltage which is reached when the relay is energized, so that relay chattering is avoided.

In order to maintain a minimum load across the output terminals 15 and 16, there is provided a loading reactor 64 connected in parallel with the output terminals.

The fifth and third harmonic suppression filters 12 are connected across the primary winding 17 and the secondary winding, respectively, of the autotransformer 1, in order to filter out any distortion in the line. The fifth harmonic filter comprises an inductance 65 and a capacitor 66 in series connection, the series connection being connected between the tap 18 and the lower end terminal 19 of the autotransformer. The third harmonic filter comprises an inductance 67 and a capacitor 68 in series connection, the series connection being connected between the upper and lower end terminals of the autotransformer.

An indicating lamp 69 connected across the output terminals 15 and 16 depicts whether the regulating system is in operation.

In the operation of the regulating system of the invention, the first direct current winding 21 imposes an initial control on the regulating system output voltage by decreasing the effective reactance of the alternating current windings 20 and 20', to increase the output voltage, when the current through said direct current winding is increased due to an increase in the load applied to the output terminals 15 and 16 normally tending to decrease the output voltage. This control is produced by the sensing circuit 4 which, through the phase detector 7, the direct current amplifier 8 and the direct current winding 21, reduces the reactance of the windings 20 and 20'. The control is further assisted by the control produced by the rectifier 3 and the direct current windings 22 and 22', which carry an increased current when the current in the winding 21 increases.

When the input voltage increases or decreases, a slight corresponding change in the current through the rectifier 3 and the windings 22 and 22' occurs, tending to accentuate this change in the output voltage. However, the sensing circuit 4 through the phase detector 7, the direct current amplifier 8 and the winding 21, produces a compensating change in current through the winding 21, as explained, which overcomes the slight change in current in the windings 22 and 22' produced by the input voltage. Any current variation in the winding 21 produces a corresponding variation in the alternating current in the windings 20 and 20'. Since the current in the windings 22 and 22' is the rectified average value of the alternating current and since the windings 22 and 22' are wound in the same sense as the winding 21, the saturating action of any variation in current in the winding 21 is aided by a corresponding variation in the current in the windings 22 and 22'.

The winding 21 increases the effective reactance of the windings 20 and 20', to decrease the output voltage, when the current through the winding 21 is decreased due to a decrease in the load applied to the output terminals 15 and 16 normally tending to increase the output voltage. The second direct current windings 22 and 22' aid the control imposed on the regulating system output voltage by affecting the reactance of the alternating current windings in the same manner as the first direct current winding to maintain the output voltage virtually constant notwithstanding changes of the input voltage or load.

It is to be understood that the invention is not limited to the details disclosed but includes all such variations and modifications as fall within the spirit of the invention and the scope of the appended claims.

Having thus set forth the nature of my invention, what I claim is:

1. A stable electronic voltage regulating system comprising a transformer having primary and secondary winding elements, input means for a source of alternating current, a saturable reactor having an alternating current winding and a direct current winding, means for connecting said saturable reactor alternating current winding and said primary winding element in series to said input means, means for producing a first alternating current control voltage having phase polarity variations and amplitude variations as determined by the direction and extent of variations of the voltage of said secondary winding element from a predetermined voltage value, said means comprising a voltage responsive variable resistance element and an impedance connected in series therewith, means coupled to said alternating current control voltage producing means for producing a second control voltage having an intensity about a reference value as determined by the phase polarity and amplitude of said first control voltage, said latter means comprising a phase detector and means for applying thereto said first alternating current control voltage and an alternating voltage of reference phase, and means for energizing said direct current winding in accordance with variations of said second control voltage.

2. A stable electronic voltage regulating system comprising a transformer having primary and secondary winding elements, input means for a source of alternating current, a saturable reactor having an alternating current winding and a direct current winding, means for connecting said saturable reactor alternating current winding and said primary winding element in series to said input means, means for producing a first alternating current control voltage having phase polarity variations and amplitude variations as determined by the direction and extent of variations of the voltage of said secondary winding element from a predetermined voltage value, said means comprising a series connection of a voltage responsive variable resistance element and an adjustable impedance, means coupled to said alternating current control voltage producing means for producing a second control voltage having an intensity about a reference value as determined by the phase polarity and amplitude of said first control voltage, said latter means comprising a phase detector and means for applying thereto said first alternating current control voltage and an alternating voltage of reference phase, and means for energizing said direct current winding in accordance with variations of said second control voltage.

3. A stable electronic voltage regulating system as claimed in claim 2, further comprising means for substantially reducing said direct current energization upon the occurrence of an overload voltage at said secondary winding element and means for energizing said last-mentioned means in accordance with the voltage of said secondary winding element.

4. A stable electronic voltage regulating system comprising a transformer having primary and secondary winding elements, input means for a source of alternating current, a saturable reactor having an alternating current winding and a direct current winding, means for connecting said saturable reactor alternating current winding and said primary winding element in series to said input means, means for producing a first alternating current control voltage having phase polarity variations and amplitude variations as determined by the direction and extent of variations of the voltage of said secondary winding element from a predetermined voltage value, said means comprising a voltage sensing bridge having two branches, a voltage responsive variable resistance element and an impedance connected in series therewith in one of said branches, an impedance and a variable resistor connected in series therewith in the other of said branches, means coupled to said alternating current control voltage producing means for producing a second control voltage having an intensity about a reference value as determined by the phase polarity and amplitude of said first control voltage, said latter means comprising a phase detector and means for applying thereto said first alternating current control voltage and an alternating voltage of reference phase, and means for energizing said direct current winding in accordance with variations of said second control voltage.

5. A stable electronic voltage regulating system comprising a transformer having primary and secondary winding elements, input means for a source of alternating current, a saturable reactor having an alternating current winding and a direct current winding, means for connecting said saturable reactor alternating current winding and said primary winding element in series to said input means, means for producing a first alternating current control voltage having phase polarity variations and amplitude variations as determined by the direction and extent of variations of the voltage of said secondary winding element from a predetermined voltage value, said means comprising a voltage responsive variable resistance element and an impedance connected in series therewith, means coupled to said alternating control voltage producing means for producing a second control voltage having an intensity about a reference value as determined by the phase polarity and amplitude of said first control voltage, said latter means comprising a phase detector and means for applying thereto said first alternating current control voltage and an alternating voltage of reference phase, means for producing a sense of change voltage in accordance with the rate of change of variations in the voltage of said secondary winding element, and means for energizing said direct current winding in accordance with both said sense of change voltage and variations of said second control voltage.

6. A stable electronic voltage regulating system comprising a transformer having primary and secondary winding elements, input means for a source of alternating current, a saturable reactor having an alternating current winding, a first direct current winding and a second direct current winding, a rectifier bridge having input terminals and output terminals, means for connecting said saturable reactor alternating current winding, said primary winding element and said rectifier bridge input terminals in series to said input means, said rectifier bridge output terminals being connected in series between the ends of said first direct current winding, means for producing a first alternating current control voltage having phase polarity variations and amplitude variations as determined by the direction and extent of variations of the voltage of said secondary winding element from a predetermined voltage value, said means comprising a voltage responsive variable resistance element and an impedance connected in series therewith, means coupled to said alternating current control voltage producing means for producing a second control voltage having an intensity about a reference value as determined by the phase polarity and amplitude of said first control voltage, said latter means comprising a phase detector and means for applying thereto said first alternating current control voltage and an alternating voltage of reference phase, and means for energizing said second direct current winding in accordance with variations of said second control voltage.

7. A stable electronic voltage regulating system as claimed in claim 6, wherein said transformer is an autotransformer.

8. A stable electronic voltage regulating system comprising a transformer having primary and secondary winding elements, input means for a source of alternating current, a saturable reactor having an alternating current winding, a first direct current winding and a second direct current winding, a rectifier bridge having input terminals and output terminals, means for connecting said saturable reactor alternating current winding, said primary winding element and said rectifier bridge input terminals in series to said input means, said rectifier bridge output terminals being connected in series between the ends of said first direct current winding, means for producing a first alternating current control voltage having phase polarity variations and amplitude variations as determined by the direction and extent of variations of the voltage of said secondary winding element from a predetermined voltage value, said means comprising a voltage sensing bridge having a first branch comprising a voltage responsive variable resistance element and an impedance connected in series therewith and a second branch comprising an impedance and a variable resistor connected in series therewith, capacitive reactance means connected in shunt with said second branch, phase shifting means, means coupled to said alternating current control voltage producing means through said phase shifting means for producing a second control voltage having an intensity about a reference value as determined by the phase polarity and amplitude of said first control voltage, said latter means comprising a phase detector and means for applying thereto said first alternating current control voltage and a reference voltage derived from the voltage of said secondary winding element, and means for energizing said second direct current winding in accordance with variations of said second control voltage.

9. A stable electronic voltage regulating system comprising an autotransformer having primary and secondary winding elements, input means for a source of alternating current, a saturable reactor having an alternating current winding, a first direct current winding and a second direct current winding, means for producing a first alternating current control voltage having phase polarity variations and amplitude variations as determined by the direction and extent of variations of the voltage of said secondary winding element from a predetermined voltage value, said means comprising a voltage sensing bridge having two branches, a voltage responsive variable resistance element and an impedance connected in series therewith in one of said branches, an impedance and a variable resistor connected in series therewith in the other of said branches, phase shifting means, filtering means coupled to said alternating current control voltage producing means through said phase shifting means, amplifying means, means coupled to said filtering means through said amplifying means for producing a second control voltage having an intensity about a reference value as determined by the phase polarity and amplitude of said first control voltage, said latter means comprising a phase detector and means for applying thereto said first alternating current control voltage and a reference voltage derived from the voltage of said secondary winding element, means for producing a sense of change voltage in accordance with the rate of change of variations in the voltage of said secondary winding element, and means for energizing said second direct current winding in accordance with both said sense of change voltage and variations of said second control voltage, said last-mentioned means comprising a direct current amplifier coupled to the output of said phase detector and to the output of said sense of change voltage producing means, said second direct current winding being coupled to the output of said direct current amplifier.

References Cited in the file of this patent

UNITED STATES PATENTS

| | | |
|---|---|---|
| 2,366,577 | Thompson | Jan. 2, 1945 |
| 2,435,572 | Bixby | Feb. 10, 1948 |
| 2,690,535 | Pouma et al. | Sept. 28, 1954 |